United States Patent [19]

Diaz et al.

[11] Patent Number: 5,361,255
[45] Date of Patent: Nov. 1, 1994

[54] METHOD AND APPARATUS FOR A HIGH SPEED ASYNCHRONOUS TRANSFER MODE SWITCH

[75] Inventors: Felix V. Diaz; Jack H. Stanley, both of Plano, Tex.

[73] Assignee: DSC Communications Corporation, Plano, Tex.

[21] Appl. No.: 693,553

[22] Filed: Apr. 29, 1991

[51] Int. Cl.⁵ .......................................... H04Q 11/04
[52] U.S. Cl. ................................. 370/58.1; 370/60
[58] Field of Search ............. 370/59, 60, 94.1, 95.1, 370/60.1, 61, 14, 15, 63, 58.1-58.3, 64, 67; 379/269, 285

[56] References Cited

U.S. PATENT DOCUMENTS

| | | | |
|---|---|---|---|
| 3,890,469 | 6/1975 | Kelly et al. | 370/59 |
| 3,928,804 | 12/1975 | Schmidt et al. | 370/59 |
| 4,542,497 | 9/1985 | Huang et al. | 370/60 |
| 4,603,416 | 7/1986 | Servel et al. | 370/60 |
| 4,797,880 | 1/1989 | Bussey, Jr. et al. | 370/60 |
| 4,817,084 | 3/1989 | Arthurs et al. | 370/60 |
| 4,839,891 | 6/1989 | Kobayashi et al. | 370/60 |
| 4,852,089 | 7/1989 | Berry et al. | 370/95.1 |
| 4,864,558 | 9/1989 | Imagawa et al. | 370/60 |
| 4,864,560 | 9/1989 | Quinquis et al. | 370/60 |
| 4,866,701 | 9/1989 | Giacopelli et al. | 370/60 |
| 4,884,264 | 11/1989 | Servel et al. | 370/58.1 |
| 4,899,334 | 2/1990 | Shimizu | 370/60 |
| 4,947,388 | 8/1990 | Kuwahara et al. | 370/60 |
| 4,955,017 | 9/1990 | Eng et al. | 370/60 |
| 4,964,119 | 10/1990 | Endo et al. | 370/60 |
| 4,970,714 | 11/1990 | Chen et al. | 370/17 |
| 4,975,906 | 12/1990 | Takiyasu et al. | 370/94.1 |
| 5,105,292 | 4/1992 | Le Roy et al. | 370/50 |

Primary Examiner—Douglas W. Olms
Assistant Examiner—Ajit Patel
Attorney, Agent, or Firm—Baker & Botts

[57] ABSTRACT

A method and apparatus for a high speed asynchronous transfer mode switch is provided which includes an input buffer circuit coupled to communication lines for receiving and temporarily storing packets from the communication lines, a switch comprising one or more planes and output circuitry for coupling the switch outputs to respective communication lines. The switch is comprised of a plurality of switching elements, each of which include a sorter for ranking packets responsive to addresses associated with the packets, compare circuitry for receiving the ranked packets from the sorter and passing up to a predetermined number of packets having the same address, and routing circuitry for routing the packets passed by the compare circuitry responsive to the associated addresses. After a packet is successfully transferred through the switch, an acknowledge signal is returned to the sending input buffer circuit.

36 Claims, 10 Drawing Sheets

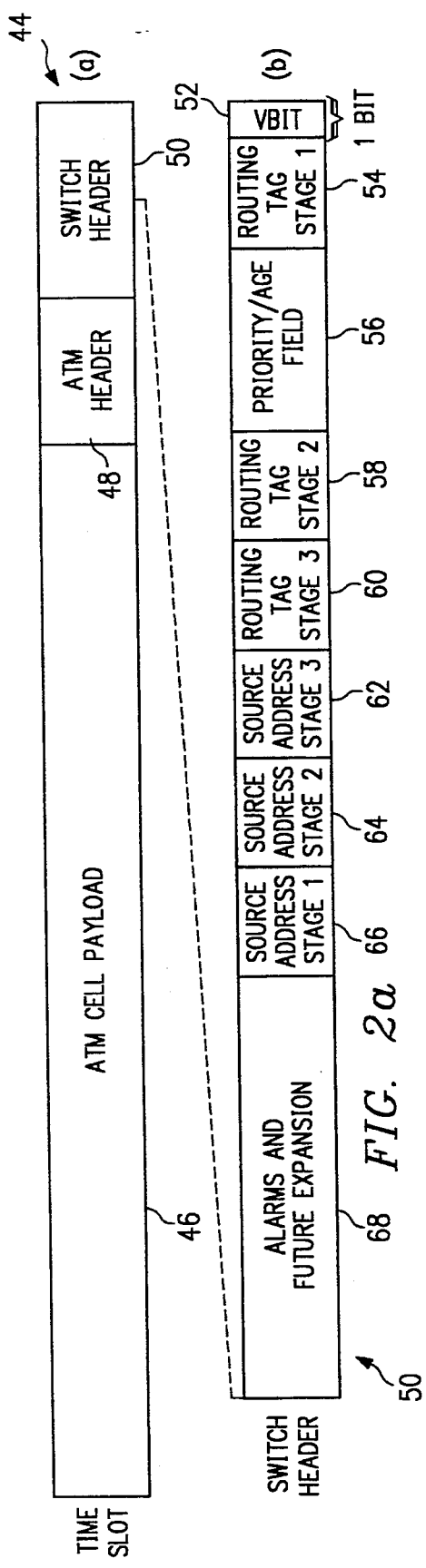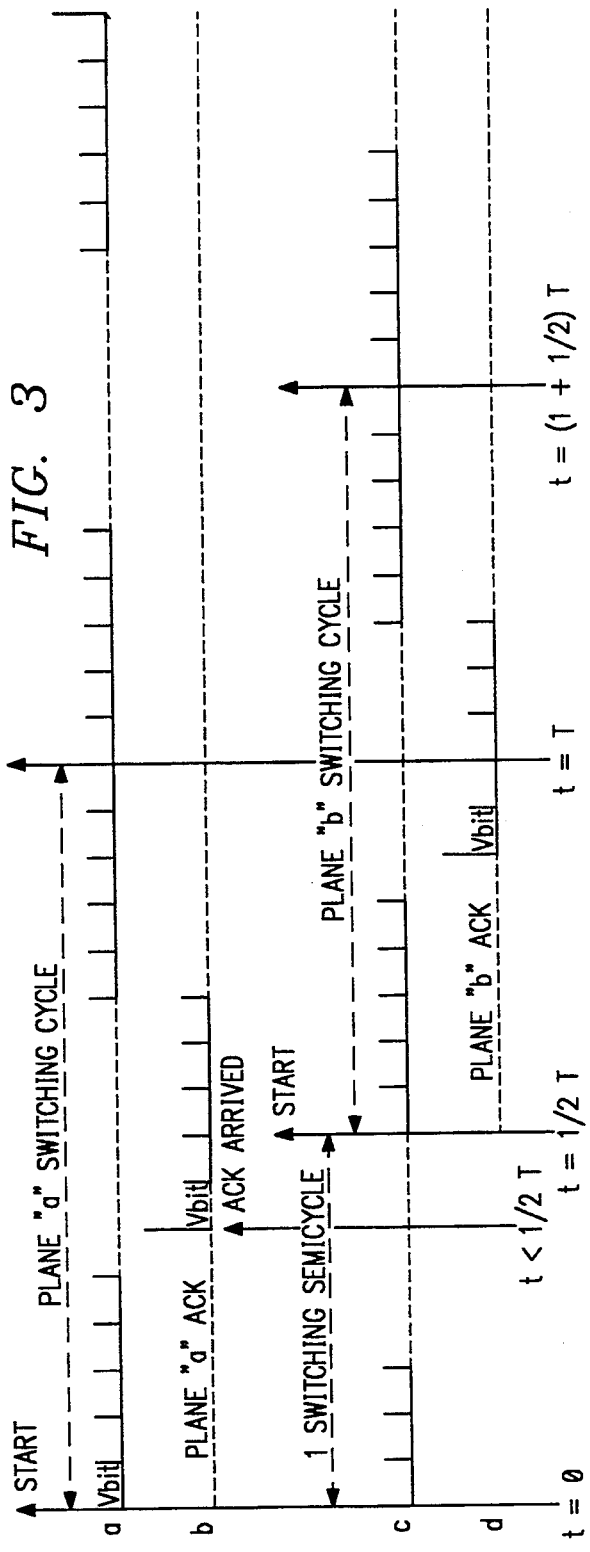

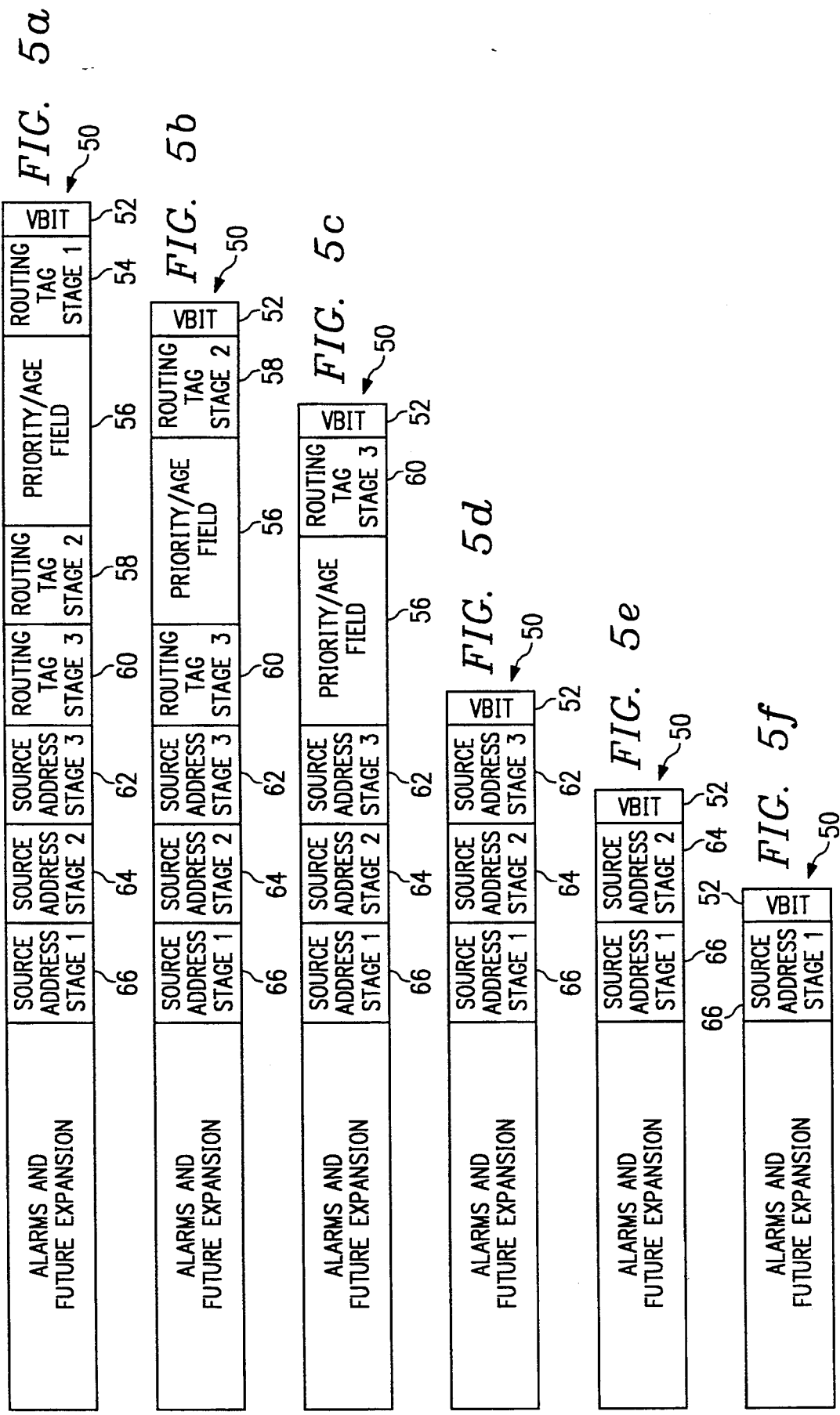

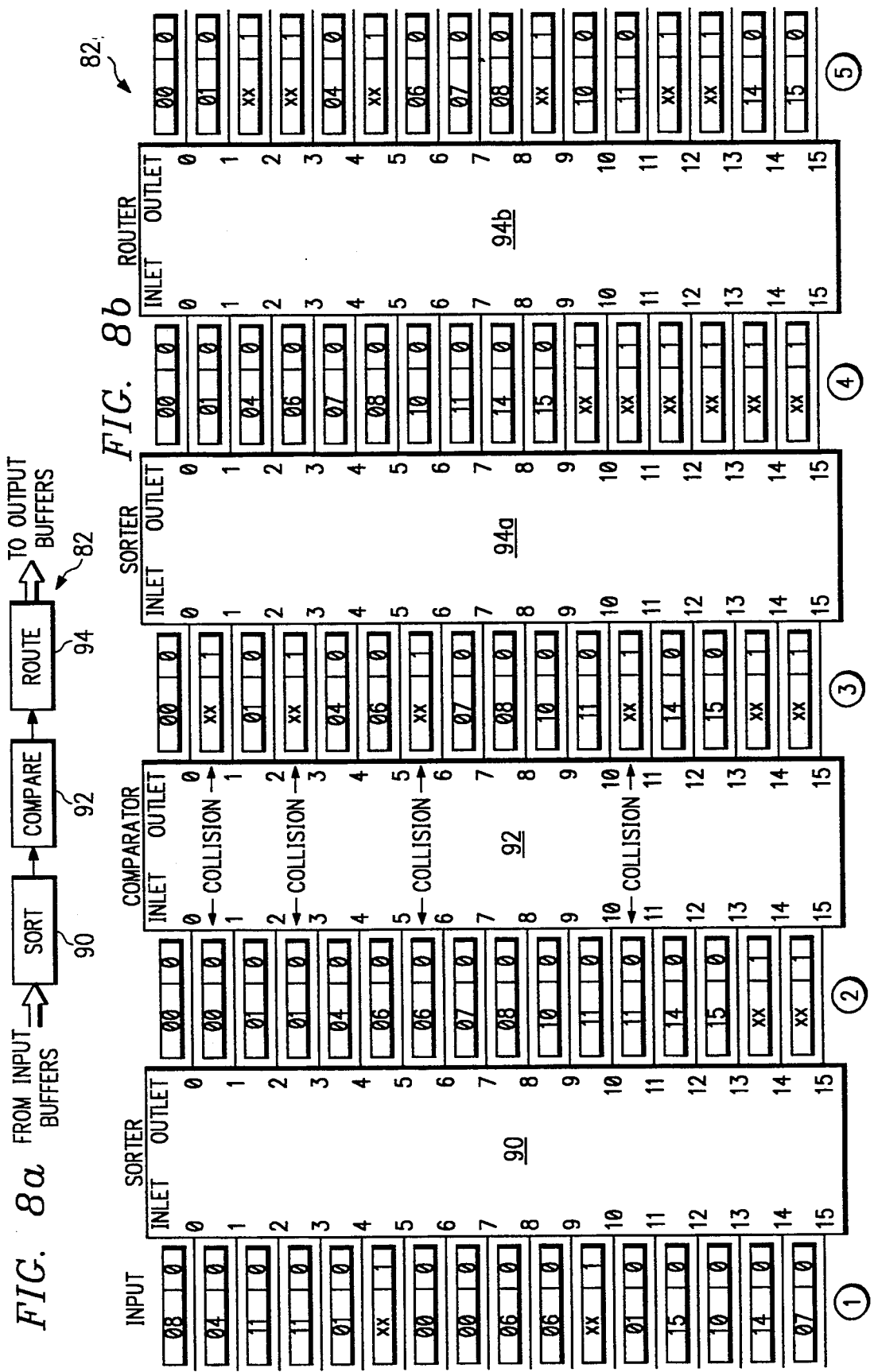

METHOD AND APPARATUS FOR A HIGH SPEED ASYNCHRONOUS TRANSFER MODE SWITCH

TECHNICAL FIELD OF THE INVENTION

This invention relates to digital communications, and more particularly to a method and apparatus for switching high bandwidth communication signals.

BACKGROUND OF THE INVENTION

New telecommunication services requiring the transport and switching of large amounts of data are being planned for the near future. Some possible applications for these services are LAN interconnection, motion video, and imaging. Two notable characteristics of these new services are their high bandwidth requirements (in the order of Megabits per second), and the bursty nature of their sources of information, which allows for easy packetization of the generated data.

Consequently, a new set of standards for a high speed, high performance packet network known as Broadband ISDN, or B-IDSN, are being developed in support of these new services. The B-ISDN standards call for the implementation of new packet multiplexing and switching techniques, referred to as Asynchronous Transfer Mode (ATM). In ATM, information is carried in packets of fixed size, presently equal to 53 octets, called cells. Those packets are individually labelled by appending addressing/multiplexing information into the first five octets of each cell. Packets from multiple sources are statistically multiplexed into a single transmission facility. The packets are identified by the contents of their headers rather than by their time position in the multiplexed stream. A single ATM transmission facility may carry hundreds of thousands of ATM cells per second.

A new generation of switching devices is needed to handle the high speed ATM streams. These devices perform the switching function in real time, by analyzing the information in the header of the incoming cells and routing them to the appropriate destination. Millions of cells per second need to be switched by a single device. New switching techniques that rely heavily on high density Application Specific Integrated Circuits can be applied to implementing ATM switches.

As stated above, streams of packets multiplexed in ATM form, arriving from a multiplicity of different sources, may be switched to one of a number of given destinations by ATM switching devices that interpret the addressing information in the packet headers. Unlike conventional synchronous time-division-multiplexing switches, in an ATM switch no attempt is made to organize the incoming packets in the time domain so as to avoid collisions between cells arriving at the same time, but in different inlets of the switch, when those cells are destined for the same output port of the switch. Consequently, collisions occur among cells that arrive to the switch at the same time carrying the same routing information in their headers. The ATM switch must provide a mechanism for resolving contentions for the same output among cells, by selecting one or more cells contending for delivery to the desired output according to some criteria such as cell priority.

In the event of multiple, simultaneous cell arrivals for the same destination, the ATM switch delivers one or more of the cells to the desired output and stores the remaining cells for delivery during subsequent switching intervals. It is not acceptable in the B-ISDN network to discard the undelivered cells. Therefore, it is necessary to provide sufficient storage, in the form of memory buffers, for the undelivered cells.

In the selection of an ATM switch architecture, two of the factors deciding the overall performance of the switch are the location of the cell buffers and the speed advantage of the switching fabric. The speed advantage of the switching fabric is defined as the ratio of cells that the fabric can deliver to the same output destination to the number of cells arriving at a single inlet in any given period of time. A switch fabric that can deliver, for instance, two cells to an outlet in the time that it takes for a cell to arrive at the switch enjoys a speed advantage of two.

Various combinations of buffering techniques and speed advantages have been proposed in the known state of the art. In one instance, cell buffering is provided solely at the input side of the ATM switch. The buffers are organized as FIFO queues where the incoming cells wait until they can be delivered to the desired output. One queue per input port to the switch is provided. The input queues are connected to a self-routing crossbar capable of delivering one cell per switching interval to each output (i.e., the speed advantage of the switch matrix is 1). Assuming a random distribution of destination addresses carried in the cell headers, the frequency of collisions among cells simultaneously attempting to reach the same destination limits the switch's throughput to about 0.586 Erlang. That is, a buffer overflow will occur if the inputs to the switch are loaded with cell traffic exceeding 0.586 Erlang intensity.

In another instance, a set of queues at the output side of an ATM switch of size N (N inputs by N outputs) are preceded by a switching fabric with a speed advantage equal to N, the switch size. In this way, no input buffering is required, since the switching fabric is capable of delivering N packets simultaneously present at the input side to any single destination. Output buffers are required to collect the bursts of up to N cells that may arrive at the output side of the switch while only one cell is delivered to each outlet per switching interval. This type of output buffering switch architecture is capable of handling a traffic intensity of 1 Erlang per switching port as long as the speed advantage of the fabric equals the switch size. In practice, this condition can only be maintained for small values of N (8 or 16). The throughput decays as larger switches are configured by interconnecting output buffer modules in some multiple-stage fashion.

Other switching techniques are possible. Integrating small crosspoints (e.g., 2 by 2 or 4 by 4) with buffers in some multistage interconnecting topology is one of those. The technique yields low switching throughputs and its hardware implementation is more complex than those described above. In most instances of multiple stage interconnecting arrangements whether input buffering, output buffering, or intermediate buffering is employed, the resulting switch is blocking, that is, the addition of a connection from an available inlet to an available outlet may not be possible due to the lack of an available internal link.

In addition to switching throughput, two other performance related variables need to be considered when discussing ATM switching techniques. One is cell loss, and the other is cell switching delay. Cell loss is caused by the finite size of the buffer pools forming the switch queues. Typical cell losses in input or output buffer ATM switches are in the range of 1e–06 (1 cell in 1 million) to 1e–09 (1 cell in 1 billion). These losses are relatively high by comparison to the error rates that can be expected from the fiber optic based facilities carrying the cells between switches.

Since ATM switching techniques are probabilistic in nature, cell switching delays will not be constant for all the cells arriving at the switch. Therefore, cell switching delays will be characterized by a mean value and a variance, the values of which will be dependent on the selection of the switching technique.

In B-ISDN, multiple grades of service may need to be offered in support of various forms of traffic requiring different levels of cell loss and propagation delay. It is known, for instance, that video connections can tolerate relatively large cell losses, but are very sensitive to delay variations from one cell to the next. Other forms of data traffic are more tolerant of large propagation delays and delay variance, but require very low cell losses. Finally, some forms of connection-oriented traffic (e.g., circuits) may require an ATM switch topology that is non-blocking, that is, a topology that permits the establishment of a new connection independent of the current state of occupation of the switching matrix.

Accordingly, there is a need in the art for a telecommunications switch and method of operation that allows for the passage through the switch of high volumes of information while incurring cell losses lower than those experienced by previous art. A further need exists in the art for an ATM switch that allows for large switching capacities with minimum propagation delays and delay variances, and that provides a mechanism for cell contention resolution. A further need exists in the art for a switch and method as discussed above that can handle multiple forms of traffic including forms that may require a non-blocking switching property.

SUMMARY OF THE INVENTION

In one aspect of the present invention, an ATM packet switch is provided which comprises input buffer circuits, output buffer circuits, and a switch matrix for connecting the input and output buffers. The input and output buffer circuits store packets, hereinafter referred to as segments. Segments are packets of fixed size, nominally sixty-four octets, capable of carrying an ATM cell plus overhead. The switch matrix may comprise a crossbar formed from self-routing switching elements, capable of delivering segments from any input to any output of the switch by interpreting routing information in the header field associated with the segments. The architecture does not require that the switch matrix be internally non-blocking. The switching elements may each comprise a sorter for sorting segments responsive to address, priority and age data, a comparator for simultaneously passing up to a predetermined number of segments per destination address and a router for routing the segments passed by the sorter to the outputs of the switching elements.

In the preferred embodiment, an acknowledgement signal is returned to a sending input buffer after a segment has been successfully routed through the switch matrix. If no acknowledgement signal is received within a predetermined time, the segment is re-sent.

In one embodiment, the matrix is built with two or more switching planes, each plane connected with the input and output buffers. Thus, the input buffer circuit can transmit segments in either switching planes, and conversely, every output buffer circuit may receive segments in either, or both, planes.

BRIEF DESCRIPTION OF THE DRAWINGS

For a more complete understanding of the present invention, and the advantages thereof, reference is now made to the following descriptions taken in conjunction with the accompanying drawings, in which:

FIG. 2a shows an illustration of a segment of data with an exploded view of the switch header information;

FIG. 3 shows a timing diagram of segment transfer in a two plane switch;

FIGS. 5a–f show manipulation of switch header information during routing of a segment through the switch;

FIG. 8a–b illustrate block diagrams of the switch elements used to form the switch matrix;

DETAILED DESCRIPTION OF THE INVENTION

The preferred embodiment of the present invention and its advantages are best understood by referring to FIGS. 1–12 of the drawings, like numerals being used for like and corresponding parts of the various drawings.

Figure 1:
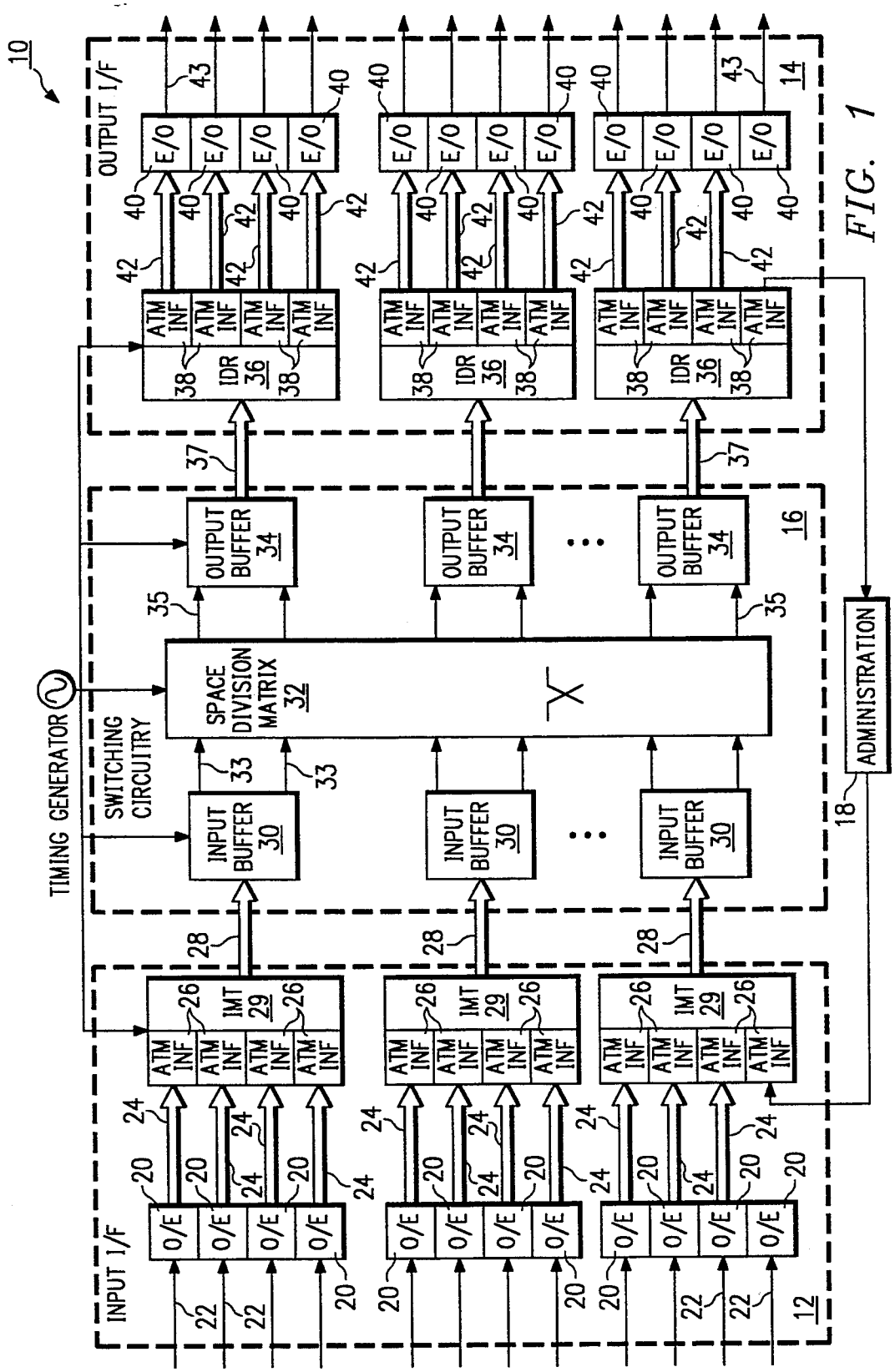
FIG. 1 shows a block diagram of a switching system of the present invention.

FIG. 1 illustrates a block diagram of an ATM switching system 10. The switching system 10 comprises four major functional blocks: input interface 12, output interface 14, switching circuitry 16 and administrative circuitry 18. Input interface 12 includes a plurality of optical-to-electrical transducers 20 which receive signals over optical cables 22 and output electrical signals over buses 24. The buses 24 are connected to ATM interfaces 26. Signals from ATM interfaces 26 are coupled to buses 28 via a intraswitch multiplexer and transmitter (IMT) 29. Buses 28 are connected to input buffers 30 of switching circuitry 16. Input buffers 30 are connected to a space division matrix 32 over buses 33. The space division matrix 32 is connected to output buffers 34 over buses 35. The output buffers 34 are coupled to intraswitch demultiplexer and receivers (IDRs) 36 over buses 37. The IDRs 36 are coupled to ATM interfaces 38 which output signals to electrical-to-optical transducers 40 over buses 42. Electrical-to-optical transducers 40 are connected to optical cables 43. Administration circuitry 18 is coupled to the input and output interfaces 12 and 14.

In operation, ATM cells are received by the ATM switching system 10 via optical cables 22. The signals from the optical cables 22 are converted to electrical signals by the optical-to-electrical interfaces 20 and transferred to respective ATM interfaces 26 which insert routing information as discussed in greater detail in connection with FIG. 2a. Data from the ATM interfaces 26 is transferred to the switch circuitry 16 which stores the data in input buffers 30. Data stored in the input buffers 30 is transferred to output buffers 34 via the space division matrix 32 in accordance with the routing information appended thereto. Data from the output buffers 34 is output to the output interface 14. The IDR 36 demultiplexes data from the output buffer 34 and transfers this data to the ATM interfaces 38. The ATM interfaces 38 outputs the data to optical cables 92 via electrical-to-optical transducers 90.

The administration circuitry 18 provides the human interface and collects alarms and other control messages from the input and output interfaces.

Although the input and output interfaces 12 and 14 are shown as separate blocks for clarity, the preferred embodiment provides bi-directional modules such that there is only one module for each input/output pair of links.

FIG. 2a illustrates a diagrammatic view of the segments managed by the switching system 10, and an exploded view of the switch header. Each segment comprises an ATM cell payload 46, an ATM header 48 and switch header 50. In the preferred embodiment, the switch header 50 is eleven bytes in length, with the last three bytes being reserved. The remaining eight bytes of the switch header are broken into a V-bit 52 (1 bit in length), a first-stage routing tag 54, a priority/age field 56, a second-stage routing tag 58, a third-stage routing tag 60, a third-stage source address field 62, a second-stage source address field 64, a first-stage source address field 66, and an alarms and future expansion field 68. The routing tags and source addresses are shown for a three-stage switch; if a greater number of switching stages is used, the number of routing tags and source address fields would change accordingly, as will be apparent in the description of the switching circuitry 16 hereinbelow. Further, the number of bits associated with each of the routing tags and source addresses will depend upon the number of switching elements in each stage. For the illustrated embodiment of a three-stage switch, with each stage having sixteen switching elements, each routing tag will comprise four bits.

ATM cells arriving at the input side of switch 10 comprise the ATM cell payload 46 and the ATM header 48. For B-ISDN applications, the payload 46 and header 48 comprise a 53-byte cell. The switch header 50 generated by the ATM interfaces 26 adds eleven bytes for a total of a 64-byte segment 44.

Figure 2B:
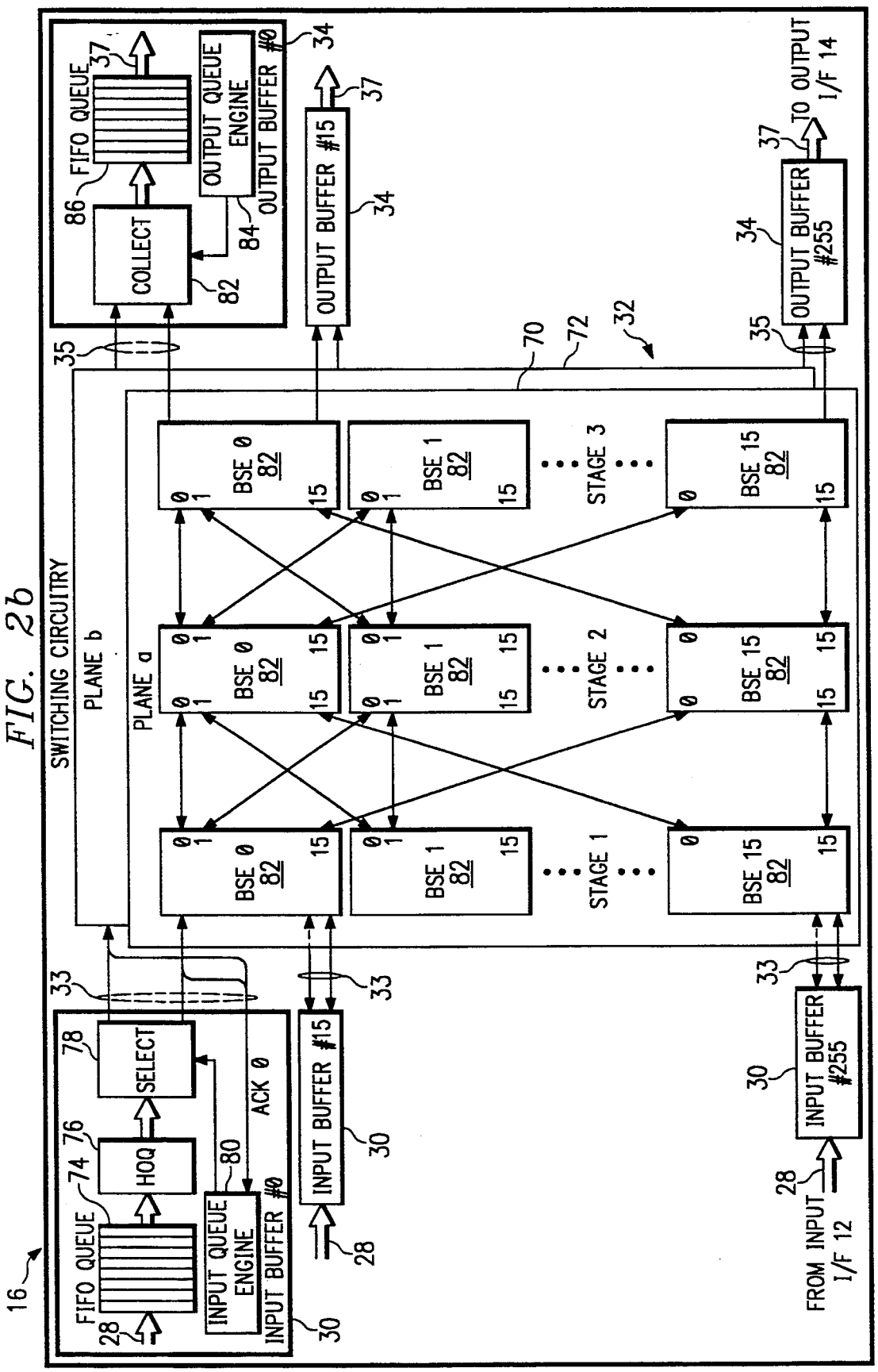
FIG. 2b shows a block diagram of one implementation of a three-stage switching circuit with input and output buffering.

FIG. 2b illustrates a block diagram of the switching circuitry 16. The switching circuitry 16 comprises a plurality of input buffers 30 (shown as input buffers #0–#255) coupled to a space division matrix 32 having first and second planes 70 and 72. The output of the matrix 32 is connected to a plurality of output buffers 34 (illustrated as output buffers #0–#255). As shown in connection with input buffer #0, input buffers 30 comprise a queue 74 coupled to a respective bus 28. The output of queue 74 is connected a head-of-queue (HOQ) 76, which stores the current output of the queue 76. HOQ 76 outputs to select circuitry 78, which outputs the data stored in the HOQ 76 to one of the two planes 70 or 72 responsive to a control signal from an input queue engine 80. The input queue engine 80 receives acknowledge signals (ACK) from the planes 70 and 72 after the data stored in the HOQ has successfully reached an output of the matrix 32.

Each plane 70 and 72 comprises a plurality of basic switching elements (BSEs) 82 arranged in a plurality of stages. In the illustrated embodiment, each of the stages comprises sixteen BSEs 82, each BSE having sixteen inputs and sixteen outputs. The interconnects between stages comprise a switching matrix; the output of a BSE (except for the last stage) is coupled to the BSE in the next stage which has the position in the next stage corresponding to the ordinal position of the output. Hence, each output "0" from the BSEs in stage one will be connected to BSE #0 of stage two. Outputs "7" of each stage one BSE will be coupled to BSE #7 of stage two. The input position of the BSE of the successive stage will be determined by the ordinal placement of the BSE in the previous stage. Hence, output "3" of BSE #1 of stage one is coupled to input "1" of BSE #7 of stage two.

The outputs of the last stage of the matrix 32 are coupled to respective output buffers 34. In the illustrated embodiment, the 256 outputs of the third-stage BSEs 82 are coupled to 256 respective output buffers 34 (labelled output buffers #0–#255). As shown in connection with output buffer #0, each output buffer 34 comprises collect circuitry 82 which chooses between outputs of the two planes 70 and 72 under control of the output queue engine 84, and a FIFO queue 86 which receives and buffers the outputs from the collect circuitry 82. The output of the FIFO queue is connected to the output interface 14 via bus 37.

In operation, segments are received from the input interface 12 and stored in the queues 74 associated with each of the input buffers 30. The current output of the queue 74 is stored in the HOQ 76 as described in greater detail in connection with FIG. 7. The data in the HOQ 76 of each input buffer 30 is alternately switched between two identical switching planes 70 and 72 in a time staggered manner, described in greater detail in connection with FIG. 3. The two identical switching planes provide a matrix 32 having a speed advantage of two, since the matrix is capable of delivering up to two segments per unit of time to a single output buffer. All input buffers 30 transmit the segments stored in the HOQ simultaneously. Therefore, all segments propagate through the switching matrix in phase. Input buffers having an empty queue 74 transmit a segment having a V-bit equal "1", indicating that the input buffer is empty and that the transmitted segment is therefore invalid. Segments are transmitted from the input buffers to the respective inputs of the BSEs 82 without regard to the destination tags or priority/age fields of the segments. Transmission of the segments does not destroy the actual content of the HOQ; the transmitted segments are copies of the data stored at the HOQ. The information of the data stored in the HOQ 76 is updated only after an acknowledge is received indicating that the segment has successfully reached its desired output, as will be described more fully hereinbelow.

At the start of each switching interval, the segments at the respective inputs of the first-stage BSEs may carry duplicate routing tags at one or more to the BSE stages. For example, the segment present at both input "3" of BSE #0 and input "4" of BSE #1 at the start of the switching cycle may be contending for output buffer 36 (which corresponds to output "4" of BSE #2 of stage three). Contentions for the same BSE outputs are detected and resolved by the BSEs 82 in the following order:

(1) if the contention among two or more segments having different priorities is detected, the segment with the highest priority is selected;

(2) if contending segments share the same priority, then the "oldest" (the one which has waited longest) is selected; or (3) if multiple segments have the same priority and age, one of the segments is randomly chosen.

In order to simplify the hardware, both the priority and age data stored in field 56 are maintained in reverse order; a low priority number corresponds to a segment with high priority and the age number associated with a segment is decremented each time the segment is not switched. A priority scheme used in the preferred embodiment is shown in Table 1.

TABLE 1

| Priority Codes | |
|---|---|
| Codes | Priority |
| 0 0 | Internal Control and Signaling (highest) |
| 0 1 | Circuit Switching |
| 1 0 | Video/Voice |
| 1 1 | Bulk Data (lowest) |

The age field is initially set to "all ones"; after each failed switching cycle (for which an ACK is not returned), the age field is decremented.

After selection of contending segments, the BSEs 82 of each stage output the "winners". The "losing" segments are not propagated through the BSEs 82. Prior to outputting the winning segments, the BSEs 82 adjust the information in the switch header 50 to set-up the path through the next stage of BSEs (as shown in connection with FIGS. 5a–e). Segments which succeed through each stage in the collision resolution tournament reach the output of the matrix 32. The headers of the segments which reach the output of the matrix (i.e., the output of stage three in FIG. 2b) are looped back towards the input side of the switch through a switch matrix and identical topology to that used in the forward path. The switching elements in this reverse matrix use the source addresses stored in sections 62, 64 and 66 of the switch header 50. No collisions are experienced in the reverse path, since all source address routing tags are unique. This is true even for multistage switching matrices, as demonstrated in connection with FIGS. 6a–b.

The headers of all packets switched through the matrix 32 return to the inputs of their origination via the reverse switching matrix. As shown in FIG. 3, the roundtrip propagation delay of those headers is less than one-half of the time taken to switch one segment, or switching interval T. The return of the header to an input queue is interpreted as a positive acknowledgment of the successful delivery of the segment at the head of the respective queue. Hence, the input queue engines 82 of the input buffers 30 will know whether or not a segment was successfully delivered prior to the beginning of the switching cycle on the next plane. Upon receiving the acknowledge, the HOQ 76 is updated, as described in connection with FIG. 7.

As shown in FIG. 3, a second switching interval begins on the second plane 72 at t=T/2, one-half of a segment's switching interval. Prior to the second switching interval, the ACK signal from the first switching interval will have returned from the reverse path (if the segment was successfully delivered). Hence, segments that were not acknowledged on the first plane may be aged (i.e., the age field of the switch header 50 is updated) and re-sent on the second switching cycle (on the other plane). The process of collision resolution and return of the winning segment headers to the source input buffer 30 is repeated for the second plane in an identical manner to the first plane.

It should be noted, however, that while the preferred embodiment is shown with two planes, any number of planes could be used. Further, while the preferred embodiment is shown with a specific architecture for the switching planes, other architectures could be used with equal effectiveness.

Each output buffer 34 stores the winning segments from respective outputs in the first and second planes in a FIFO queue 86. Switching between the first and second planes is performed by the collect circuitry 82 under control of the output queue engine 84.

Figure 4:
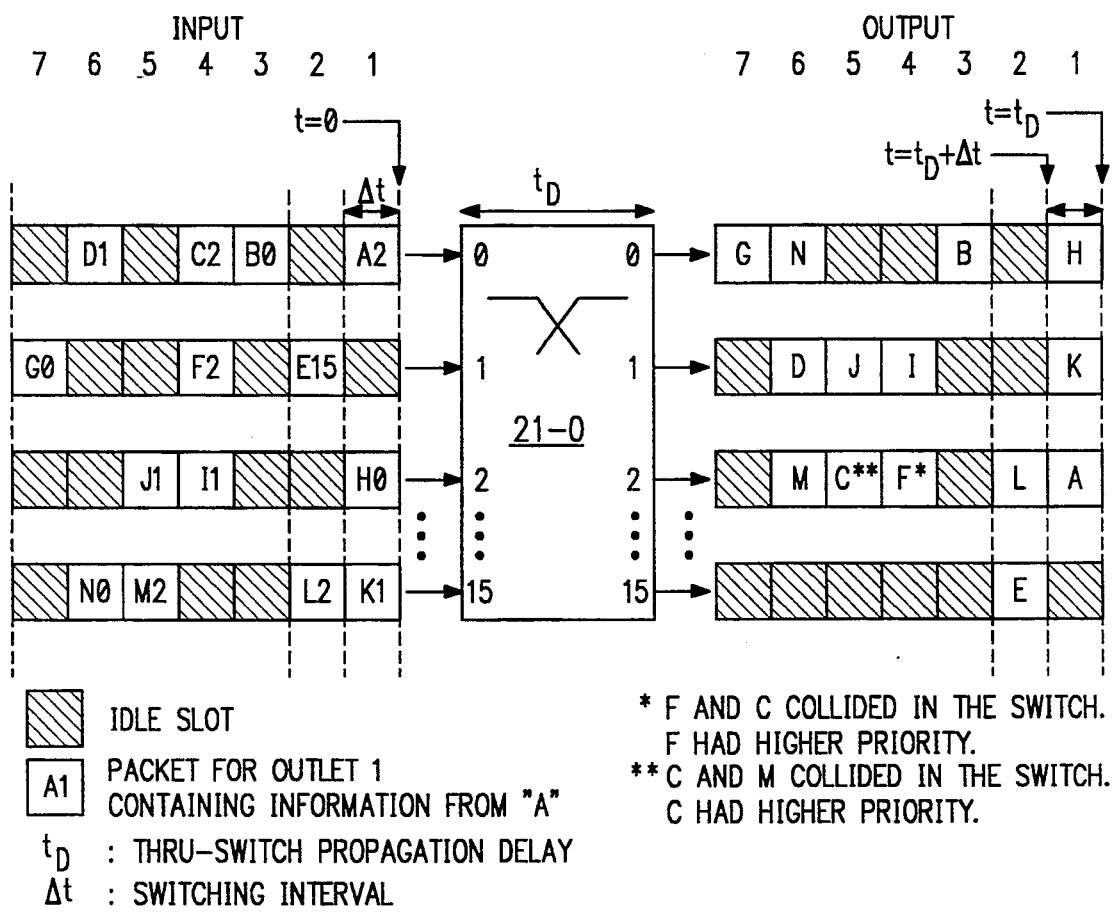
FIG. 4 shows a exemplary diagram of the contention resolution process of the present invention.

FIG. 4 illustrates operation of the contention resolution mechanism. BSE #0 has sixteen inputs (0–15) and sixteen outputs (0–15). As shown, for input "0" of BSE #0, in time slot "1" segment "A" has an output destination of two. There is no segment in time slot "1" for input "1". In time slot "1", there is segment "H" in input "2" for delivery to output "0", and a segment "K" in input "15" for delivery to output "1".

For the first time slot, all three segments (A, H, K) will propagate to the output of BSE #0 (as shown in time slot "1" of the output) because there are no duplicate destinations for the three segments. Time slots "2" and "3" also operate without repetition.

In time slot "4", however two segments ("C" and "F") in inputs "0" and "1", respectively, both have a routing tag for output destination 2. For this switching cycle, only one can propagate through the BSE. Assuming segment "F" has a higher priority than segment "C", packet "F" will propagate through the BSE in time slot "4" to output "2". Segment "C" will be re-sent in time slot "5", where it will collide with segment "M" on input "15". Assuming segments "C" and "M" have the same priority, segment "C" will advance through the switch due to its age field. While this example has been illustrated with respect to a one plane matrix, the contention resolution works with any number of planes. Assuming a two plane matrix, the segments in this example sent in the odd time slots would be sent through BSE #0 of plane 70 and segments sent by the even time slots would be sent through BSE #0 of plane 72.

FIGS. 5a–f illustrate the preferred embodiment of manipulating the header information during the forward and reverse paths through the matrix 32. FIG. 5a illustrates the header information as received by the inputs to the first stage of BSEs 82 of the matrix 32. The first stage BSEs 32 manipulate the header 50 such that the header is output with the stage two routing tag 58 positioned between the V-bit 52 and the priority/age field 56. The outputs of the second stage BSEs manipulate the header once again such that the stage three routing tag 60 is positioned between the V-bit 52 and the priority/age field 56 as shown in FIG. 5c.

In FIG. 5d, the header 50 is shown as configured for the input of the reverse path. Since the reverse path has already been defined, and since no contentions will occur, the priority/age field 56 is no longer needed. Hence, the header is shown with the source address fields 62, 64 and 66 behind the V-bit 52. After propagation through the third stage on the reverse path, the header is shown in FIG. 5e as comprising the V-bit 52 followed by the source address field 64 and 66 for stage two and stage one, respectively. In FIG. 5f, header 50 is shown with the V-bit 52 followed by the source address field 66 for stage one.

The header manipulation process illustrated in FIGS. 5a–f allows each of the BSEs 82 in the various stages to have a similar architecture, thereby reducing the cost of implementing the matrix 32.

Figure 6A:
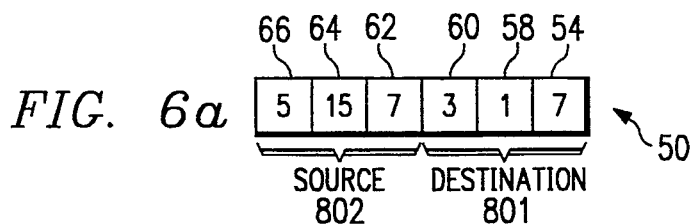
FIGS. 6a–b illustrate an exemplary switch header and a block diagram demonstrating the paths of a segment through the switch.
Figures 6B, 11:
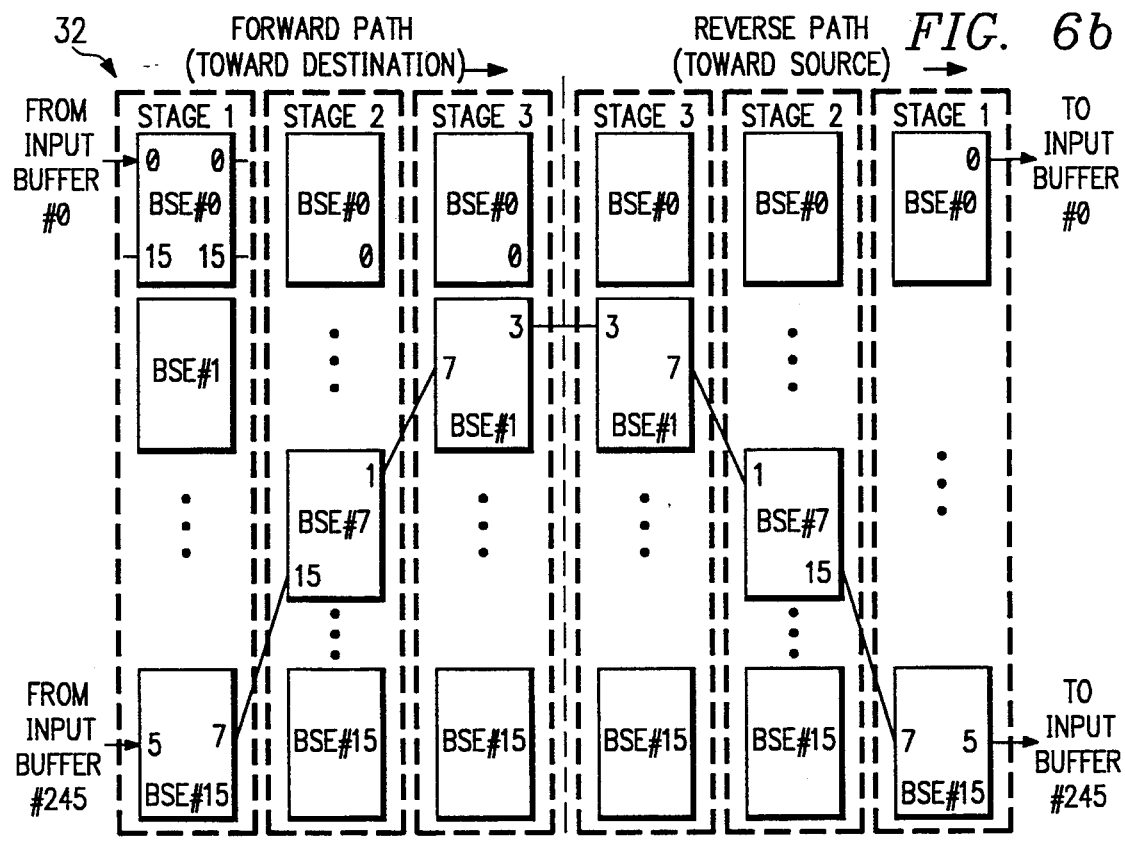
FIG. 11 illustrates a block diagram of a router.

FIGS. 6a–b illustrate the path of a segment through the matrix 32. FIG. 6a illustrates exemplary routing tags 54, 58 and 60 and source address fields 62, 64 and 66 for a segment. Destination 801 is set by the ATM interface 26 when the ATM cell entered the switch, while the source 802 is set by the input buffer 30. In this example, the segment is input to the matrix 32 through input buffer #245, corresponding to input "5" of BSE #15 of stage one. Stage one routing tag 54 is set to "7"; therefore, the segment is switched to output "7" of BSE #15 of stage one. Output "7" of BSE #15 of stage one is coupled to input "15" of BSE #7 of stage two. The stage two routing tag 58 is set to "1"; hence, the segment is switched to output "1" of BSE #7 of stage two. This output is coupled to input "7" of BSE #1 of stage three. The stage three routing tag 60 is set to "3", thereby transferring the segment to output "3" of BSE #1 of stage three. The ATM header 48 and ATM cell payload 46 is stored in output buffer 19, which is coupled to output "3" of BSE #1 of stage three. The header information 50 is transferred via the reverse path BSEs to acknowledge successful transfer of the segment through the matrix 32. Output "3" of BSE #1 of the stage three forward path is coupled to input "3" of BSE #1 of stage three of the reverse path. The stage three source address field 62 is set to "7", which transfers the header information to output "7" of BSE #1 of stage three. Output "7" of BSE #1 is coupled to input "1" of BSE #7 of stage two. The stage two source address field 64 is set to "15", thus the header information is switched to output "15" of BSE #7. Output "15" of BSE #7 of stage two is coupled to input "7" of BSE #15. The stage one source address field 66 is set to "5", which transfers the header information to output "5" of BSE #15 of stage one, which is coupled to input buffer 245. Hence, the header information returns to the input buffer which generated the segment in order to acknowledge the successful transfer of the segment.

In the reverse path, no collisions occur since only one segment could have followed the shown route from the input side to the output side of the matrix. In the case of more than one segment attempting the same route, all segments except the winner would have been eliminated. The winning segment follows the exact same route in the reverse path, ensuring its successful arrival to the input buffer #245. In this way, the collision resolution technique is extendable to any matrix topology and to any number of stages.

Figure 7:
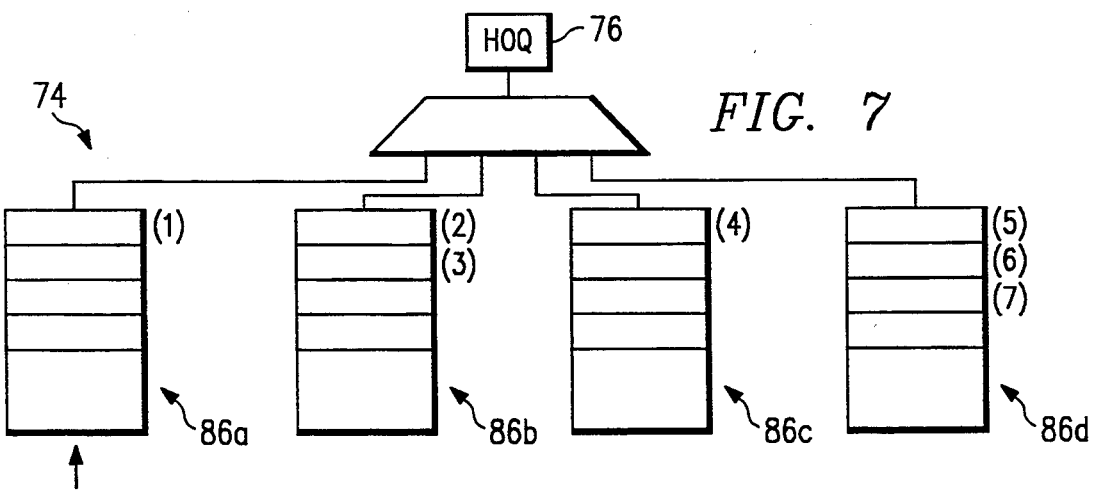
FIG. 7 illustrates a input queue mechanism.

FIG. 7 illustrates the queuing discipline 74 of the input buffers 30. The queue 74 comprises a plurality of FIFO memories 86a–d, each FIFO memory corresponding to one of the priority levels (00–11) of the illustrated embodiment. Data input to the queue 74 is placed in the appropriate FIFO memory 86a–d based on the priority associated with the incoming ATM cell. Data from the FIFO memories 86a–d is transferred to the HOQ 76 under control input queue 80. Hence, data from FIFO memory 86a, associated with priority "00" will be input to the HOQ 76 prior to data stored in the other FIFO memories. If FIFO memory 86a is empty, the data from FIFO memory 86b will be transferred to the HOQ 76, until FIFO memory 86b is empty or until new data is placed in FIFO memory 86a. Similarly, data from FIFO memories 86c and 86d will be output when the higher priority memories are empty.

FIGS. 8a–b illustrate the structure and operation of the BSEs 82. The BSEs 82 comprise sort circuitry 90, compare circuitry 92, and routing circuitry 94. Sort circuitry 90 sorts incoming segments according to: (1) whether or not the V-bit is enabled, (2) the routing tag, (3) the priority of the segment, and (4) the age of the segment. Hence, the sort circuitry 90 will group the active segments apart from the idle or invalidated segments made of an "all ones" segment. Within the group of active segments, the segments will be arranged in order of address. If two segments have the same address, the one with the lowest numeric value in the priority field (corresponding to the highest priority) will be ranked ahead, i.e., above of those with lower priorities. Where two segments have the same address and priority, the segment with the lowest numeric value in the age field (corresponding to the most aged segment) will be sorted ahead of those with larger numeric values.

The compare circuitry resolves collisions between active segments having the same routing tag address. As further discussed in connection with FIG. 11, the preferred embodiment of comparator is operable to pass a predetermined number of segments having the same address; however, for ease of illustration, it will be assumed that the comparator 92 passes one segment per address and invalidates the other segments having the same address by setting their V-bits equal to "1". The routing circuitry 94 then routes the segments to the desired output of the BSE. As will be described in greater detail in connection with FIG. 8b, an optional sorter may be used as part of the routing circuitry 94 in order to eliminate blocking in a banyan-type routing structure.

FIG. 8b graphically illustrates the flow of segments through the BSE 82. Initially, segments are presented in respective inlets of the sorter 90 without any sequencing of the desired routing address. The sorter 90 sorts the segments as described hereinabove. The segments output from the sorter 90 are input to the comparator 92 which, in the illustrated embodiment, passes only one segment per address. Since the segments are sorted by priority and age within each address group, the highest ranked segment is always passed when there are two or more segments having the same address. Sorter 94a re-sorts the segments such that all invalidated segments are ranked below the active segments. This allows a banyan-type router 94b to pass the segments to the desired outputs without experiencing any internal blocking.

Figure 9:
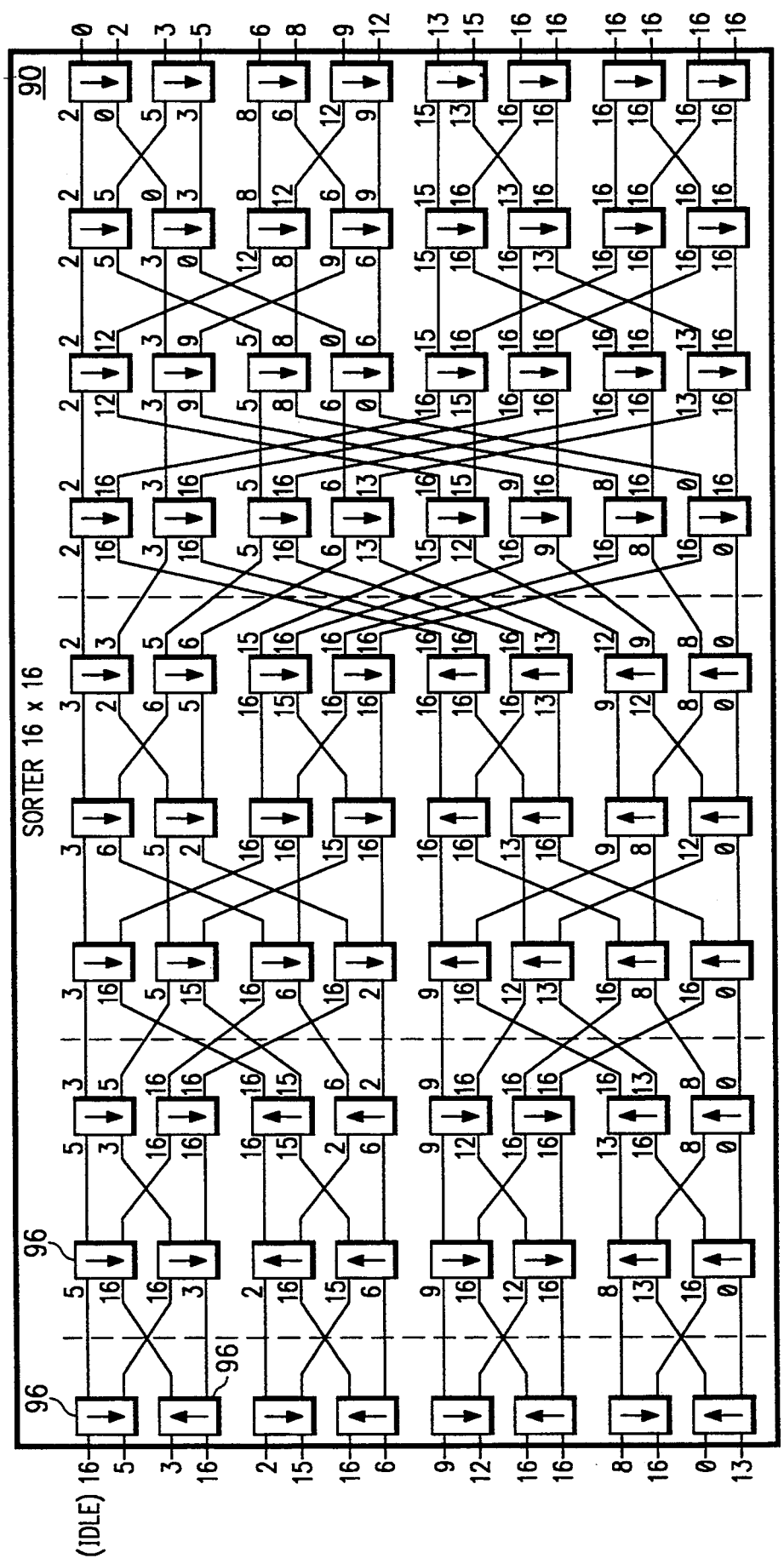
FIG. 9 is a block diagram of the implementation and operation of a sorter.

It should be noted that, in the reverse path, only the route circuitry 94 (sorter 94a and router 94b) are needed, since there are no collisions in the reverse path. FIG. 9 illustrates a block diagram of a typical implementation of a sorting circuit, along with illustrative data to show operation of the sorting circuit 90. The illustrated sorting circuit 90 is a 16×16 sorter. The sorting circuitry 90 comprises a plurality of elements 96 have two inputs and two outputs. Depending upon the respective magnitudes of the inputs, the input data may be switched directly (first input to first output and second input to second output) or crossed (first input to second output and second input to first output). Elements 96, illustrated with a downward arrow, will directly switch the input data if the first input has a lower magnitude than the second input and will cross-switch the data if the first input has a higher magnitude than the second input. Similarly, elements with an upward-pointing arrow will cross-switch the data if the first input is less than the second input and will directly switch the data if the first input is greater than the second input.

In the example shown in FIG. 9, a "16" is used to designate an idle bit (having a V-bit set to "1"). As can be seen, the sorter 90 sorts the segments responsive to the switch header information in ascending order. Similar circuitry can be used for sorter 94a of the routing circuitry 94.

Figure 10:
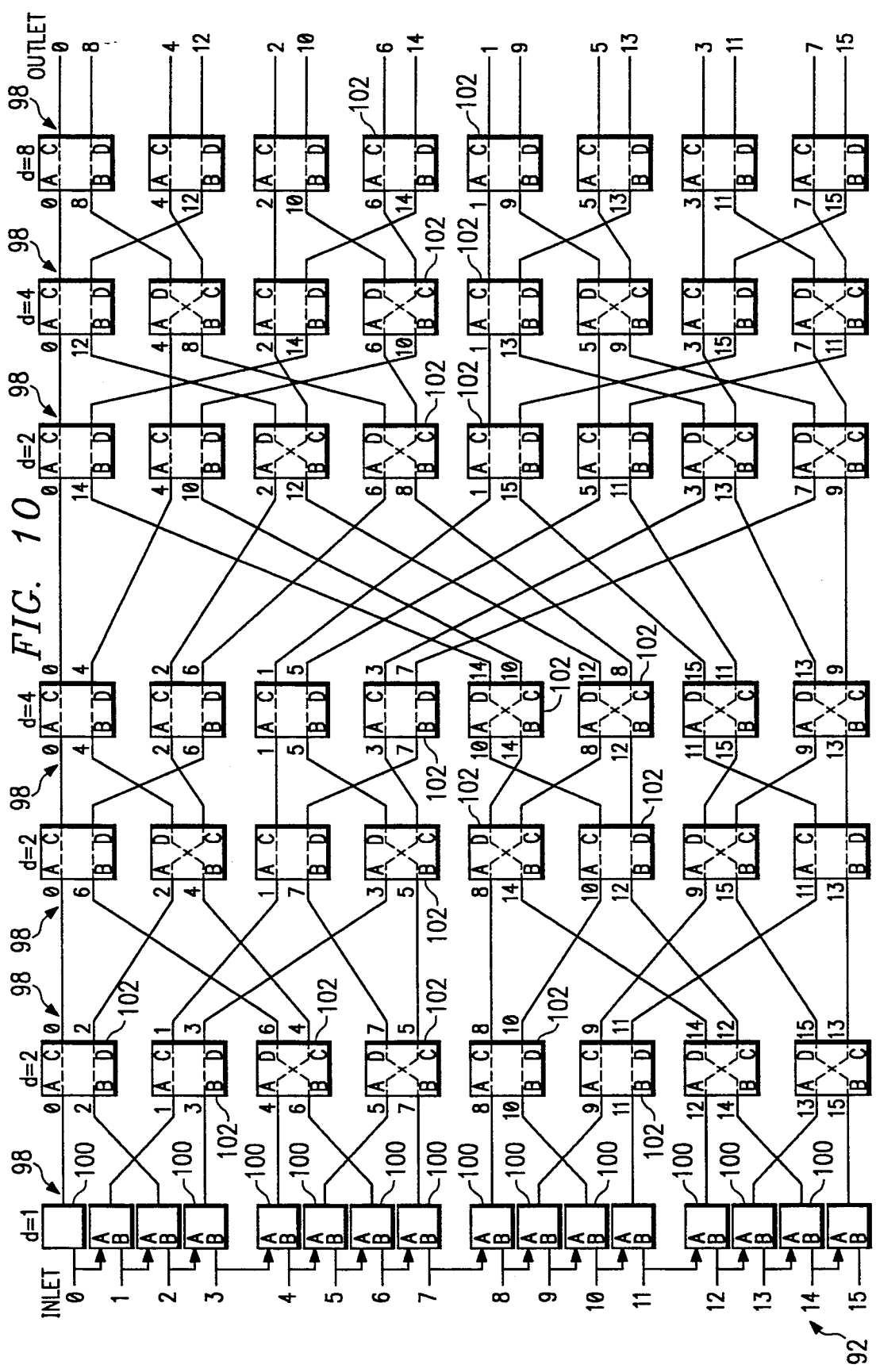
FIG. 10 is a block diagram of the implementation and operation of a comparator.

FIG. 10 illustrates the preferred embodiment of the compare circuitry, which is operable to selectively pass a predetermined number of segments having similar addresses. The comparator 92 comprises a plurality of columns 98. A designator is provided over each column; the designator denotes how many similarly addressed segments which will be passed by the comparator. For d=1, only one segment per address will be passed based on priority and age. Similarly, for d=2, up to two segments having the same address will be passed. For d=4 and d=8, four and eight segments having a similar address, respectively, will be passed by the comparator 92. The comparator 92 may be programmed for the desired compare level. For a compare level of d=1, only the elements in the column designated d=1 will be active, all other columns will simply pass the data unaltered. For compare level d=2, the elements in column d=1, d=4 and d=8 will be inactive and only the elements in columns designated d=2 will be active. While the illustrated embodiment show a comparator 92 having compare levels from d=1 to d=8, the function could be extended to any number of levels.

The elements 100 in the column designated d=1 each have two inputs and one output, with the exception of the element 100 coupled to inlet 0 (which always passes the data at inlet 0). The elements 100 pass the data unaltered at input "B" if inputs "A" and "B" are not equal and input B is a valid segment. If inputs "A" and "B" are equal, then the element 100 invalidates the segment by setting the V-bit equal to "1", since the segments at the input of the comparator have already been sorted and ranked according to V-bit, address, priority and age. Consequently, a segment will be passed only if its routing tag is not equal to the routing tag of the segment in the inlet immediately above it. Since there is no inlet above inlet 0, the data, if valid, will always be passed.

The elements 102 in the remaining columns (d=2, 4 and 8) have two inputs ("A" and "B") and two outputs ("C" and "D"). If the address of the segment at input "B" is equal to the address of the segment at input "A", then the segment at input "B" is invalidated by setting its V-bit equal to "1". If the address and V-bit information of the segments at A and B are not equal, then the segment at input "B" is passed through to output "D". The segment at input "A" is always passed to output "C". For ease of illustration, some elements 102 are shown with a cross to denote a switch in the physical locations of the output "C" and "D" in order to properly route the segments to the next stage 98.

FIG. 11 illustrates a block diagram of the router 94b. As previously discussed in connection with FIGS. 8a-b, the inputs to the router 94b will be sorted such that segments are input in ascending order starting at inlet 0. Invalidated segments are input to inlets below the active segments. The router 94b comprises a plurality of elements 104 which operate as described in Table 2.

TABLE 2

| ROUTER ELEMENT SWITCHING FUNCTION | | |
|---|---|---|
| A | B | Switch |
| 0 | X | pass |
| 1 | X | cross |
| X | 0 | cross |
| X | 1 | pass | where,
X="Don't care"
"pass"=transfer A to C and B to D
"Cross"=transfer A to D and B to C The router 94b comprises four stages 106a-d, each stage corresponding to a respective bit in the routing tag. In the illustrated embodiment of FIG. 10, four stages are used in order to route the inputs to a desired output. Each stage acts on a successive bit of the address: stage 106a operates on the first (MSB) bit of the routing tag, stage 106b operates responsive to the second bit of the routing tag, stage 106c operates responsive to the third bit of the routing stage and state 106d operates responsive to the fourth bit (LSB) of the routing tag. Each element 104 also operates responsive to the V-bit of the segment routed therethrough prior to receiving the relevant bit of the routing tag If the V-bit is equal to "1", then all subsequent routing tag bits are treated as "don't cares". Assuming the V-bits are set to "0" for each segment being routed through an element, the element will pass the segments directly (from input A to output C and from input B to output D), if B equals 1 and will cross switch the segments (from input A to output D and from input B to output C) if A equals 1. If the segment at input A is invalid (a "don't care"), the segment at input B will passed directly if the address bit at input B is equal 1 and will be cross switched if the address bit is equal to 0. If the segment at input B is invalid, then the segment at input A will be passed directly if the address tag at input A is equal to 0 and cross switched if the address bit at input A is equal to 1. If both segments coupled to the element 104 is invalid, the path is irrelevant.

The designator d, which specifies the number of segments with similar addresses passed by the compare function of FIG. 10, is also used to indicate the stages of the router that will be active. When d=1, one segment may be routed for each address, so all four stages 106a-d of the router in FIG. 11 are active. When d=2, up to two segments with similar address may be routed for each destination. In this case, only the first three stages of the router are active, while the last stage 106d will let all segments pass directly. The two segments with similar addresses are then switched to either outlet of the last stage of the router (outlets 0 or 1 for address=0, outlets #2 or #3 for address=1, etc.). Similarly, when d=4, only the first two stages 106a and 106b of router 94b will be active. The groups of up to four segments with similar addresses are placed in outlets #0-#3, #4-#7, #8-#11 and #12-#15. For the case of d=8, only the first stage 106a in active.

Figure 12:
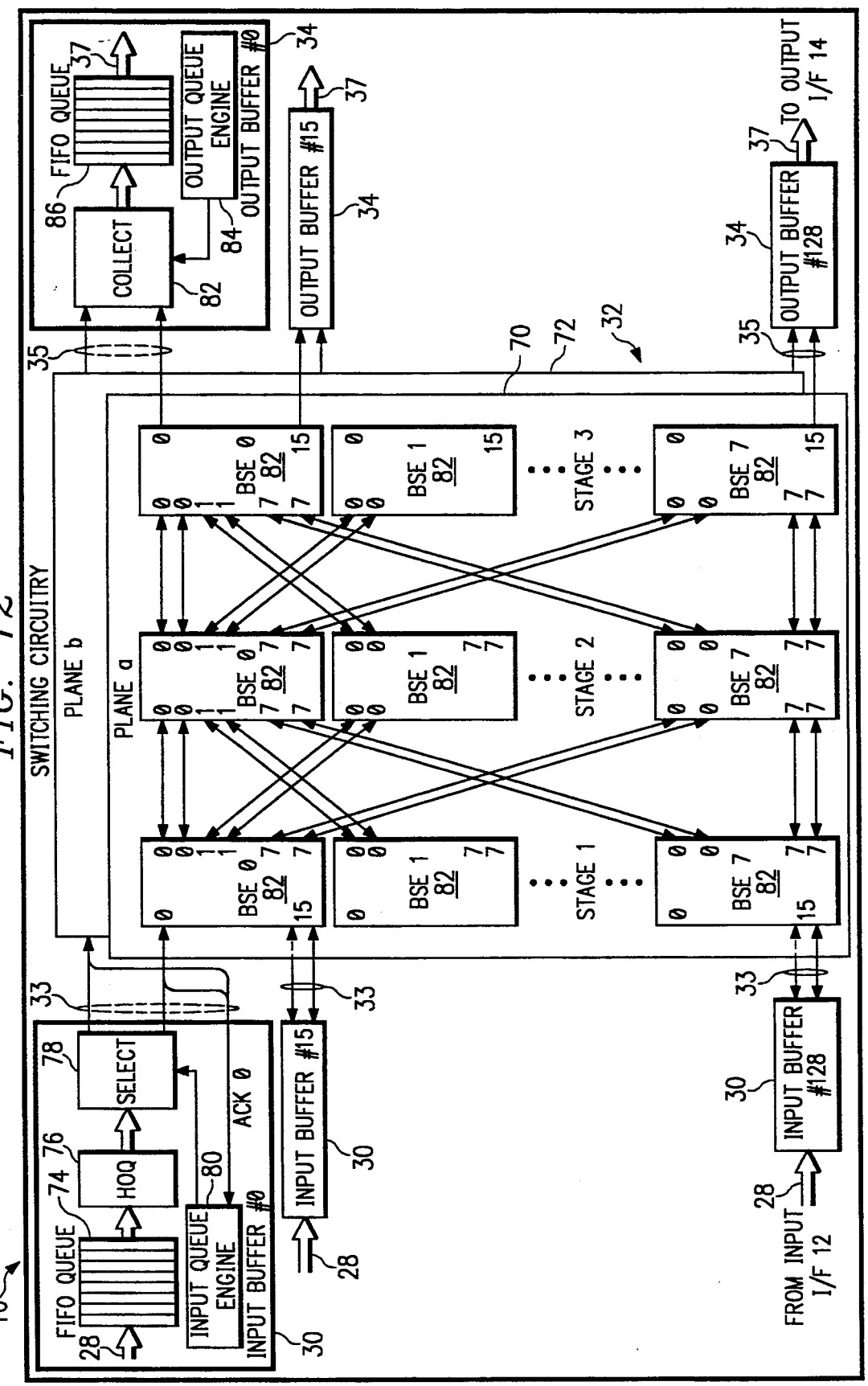
FIG. 12 illustrates a block diagram of a three-stage switch using multiple internal links.

FIG. 12 illustrates an alternative embodiment of the present invention wherein the stages of switching elements 82 are connected by groups of links. Thus, the outputs of the first and second stages of BSEs 82 have pairs of output addresses, i.e., the BSEs 82 have two outputs designated "0", two outputs designated "1", and so on. Using a 16-port BSE, there will be eight output addresses (0–7), each output address having two ports. The BSEs are cross-coupled as shown in FIG. 2b; however, similarly designated outputs are coupled to the same BSE of the next stage. Hence, both outputs designated "0" on BSE #0 of the first stage are coupled to the two inputs (both designated "0") of BSE #0 of stage two. The outputs of the third stage of BSEs are designated #0–#15.

While the illustrated embodiment shows link groups of two, the link groups could be greater in number. The BSEs having link groups are enabled by programming the comparator shown in FIG. 10 to pass two or more segments having the same address through to the output. If, for example, a link group of two is chosen, two packets addressed to output "0" will be transferred to outlets "0" and "1" of comparator 92 shown in FIG. 10.

Group links provide the advantage that each plane of the matrix has reduced internal blocking, thereby increasing the throughput of the matrix plane. While FIG. 12 illustrates two planes 70 and 72, the use of group links may be performed with more or less planes as desired.

The present invention provides significant technical advantages over the prior art. A single input queue can transmit two segments to the same or different destination in a unit of time, over the two planes (or can transmit a greater number of segments if additional planes are used). The instantaneous throughput delivered by the input queues can exceed one Erlang (on the combination of two planes), and thus, the throughput limit of 0.88 Erlang for systems with a simple speed advantage of two is exceeded. Second, the input queues are acknowledged after each segment has been received, thereby decreasing or eliminating the number of lost or misdelivered segments. Third, the switching elements used to form the switching matrix may be programmably enabled to pass one or more segments having a common address thereby reducing contentions between segments.

The switching elements may comprise a sorter for ranking packets from a plurality of input buffer circuits, compare circuitry for receiving the ranked packets from the sorter and passing up to a predetermined number of packets having the same address, and routing circuitry for routing the packets passed by the compare circuitry responsive to the associated addresses. If packets in excess of the predetermined number of packets have the same address, the compare circuitry will pass packets based on priority and age. If the routing circuitry uses a banyan topology, or other topology which is internally blocking, the routing circuitry may also include a sorter to sort the packets passed by the compare circuitry.

Although the present invention and its advantages have been described in detail, it should be understood that various changes, substitutions and alterations can be made herein without departing from the spirit and scope of the invention as defined by the appended claims.

What is claimed is:

1. Switching circuitry for asynchronous transfer mode switching of digital information packets between a plurality of inputs and a plurality of outputs, comprising:

input buffers coupled to said plurality of inputs for receiving a plurality of packets therefrom, queuing packets from each input, and retaining a copy of first ones of said queued packets;

a sorter coupled to said input buffers for receiving first ones of said queued packets, and ranking said packets responsive to addresses associated with said packets, said sorter ranking packets having the same associated address according to priority data associated with said packets, and further ranking packets having the same associated address and priority data according to age data associated with said packets, said age data being generated in dependence upon the number of times a packet fails to reach its addressed destination and being updated in the copy of unrouted packets stored in said input buffers;

compare circuitry coupled to said sorter and receiving said ranked packets from said sorter and simultaneously passing more than one packet up to a maximum number of packets having identical addresses; and routing circuitry for routing the packets passed by said compare circuitry in response to the associated addresses.

2. The switching circuitry of claim 1 wherein said compare circuitry passes one of said ranked packets which are not adjacent to a higher ranked packet having identical addresses.

3. The switching circuitry of claim 1 wherein the number of simultaneously passed packets is selectable.

4. The switching circuitry of claim 1 wherein said routing circuitry includes circuitry for receiving packets passed by said compare circuitry and sequencing said passed packets.

5. The switching circuitry of claim 4, and further comprising a banyan topology routing circuit for routing said sequenced packets.

6. The switching circuitry of claim 1 wherein said router includes circuitry for passing up to a predetermined number of packets for each destination.

7. A switching circuit coupled to external communication lines comprising:

input buffer circuits coupled to respective external communication lines for receiving and temporarily queuing packets from said external communication lines;

a switch comprising multiple planes having a plurality of inputs coupled to said input buffer circuits for switching first ones of said queued packets from said input buffer circuits to outputs of the switch corresponding to address data associated with each packet, said address data including an age data, said switch operable to send an acknowledgment signal to a sending input buffer circuit responsive to a packet being received at one of said outputs, said input buffer circuits updating age data of respective packets when a corresponding acknowledgment signal is not received, said input buffer circuits further being operable to send a packet on one of said planes and re-send the packet on another of said planes if an acknowledgment signal is not received in a predetermined time; and output buffer circuits for coupling said switch outputs to respective external communication lines.

8. The switching circuitry of claim 7 wherein said one or more planes each comprise a plurality of switching elements interconnected such that each plane is capable of delivering packets from any of said inputs to any of said outputs, such that the throughput of said switching circuitry is enhanced.

9. The switching circuitry of claim 8 wherein each of said switching elements comprises a plurality of inputs and respective outputs, each switching element operable to transfer a packet from any of its inputs to any of its outputs responsive to an address associated with the packet.

10. The switching circuitry of claim 9 wherein ones of said switching elements are operable to simultaneously transfer a plurality of packets having the same address to a plurality of outputs associated with said same address in order to reduce the number of collisions in said switch.

11. The switching circuitry of claim 8 wherein said switching elements include collision resolution circuitry.

12. The switching circuitry of claim 11 wherein each of said switching elements comprises:
 a sorter for receiving first ones of said queued packets, sorting said packets responsive to address data associated therewith, and ranking said packets;
 a comparator receiving said ranked packets and invalidating certain packets from said sorter having identical address data such that only a predetermined number of packets having identical address data are simultaneously transferred;
 said invalidated packets being deleted, such that said switching element does not send an acknowledgment signal in response to said invalidated packets; and
 routing circuitry for routing packets from said comparator to outputs of said switching element responsive to said address data associated therewith.

13. The switching circuitry of claim 7 wherein said predetermined time comprises the time between the start of a switching cycle on two successive planes.

14. The switching circuitry of claim 7 wherein said input buffer circuits each comprises:
 queuing circuitry for storing packets;
 a memory for storing a next packet from said queuing circuitry to be output to said switch; and
 control circuitry for transferring a new packet to said memory responsive to receiving said acknowledgement signal.

15. The switching circuitry of claim 7 wherein said control circuitry is operable to switch the packet with the highest priority to said memory responsive to said acknowledgement signal.

16. The switching circuitry of claim 7 wherein said switch comprises two or more planes, and said circuitry for coupling to said switch outputs further comprises control circuitry for switching between planes.

17. The switching circuitry of claim 7 and further comprising circuitry for appending routing information, priority information and age information to incoming packets, and outputting said incoming packets to said input buffer circuits.

18. The switching circuitry of claim 17 wherein said routing information includes one or more addresses for routing the associated packet through the switch and one or more addresses for routing the acknowledgement signal to the input buffer.

19. The switching circuitry of claim 7 wherein said input buffer circuits comprise means for increasing the age indication of a packet which was sent and for which an acknowledgement is not received within a predetermined time.

20. The switching circuitry of claim 7 wherein said acknowledgement signal is transmitted through said switch through a path topologically identical to the path originally taken by the packet, from said output to said input buffer circuits.

21. A method of switching digital information packets between a plurality of inputs and a plurality of outputs, comprising the steps of:
 receiving and queuing the packets;
 sorting first ones of the queued packets responsive to addresses associated with the packets by ranking packets having the same associated address according to priority data associated with the packets and further ranking packets having the same associated address and priority data according to age data associated with the packets;
 comparing the sorted packets and simultaneously passing more than one packet up to a maximum number of packets having identical addresses; and
 routing the passed packets responsive to the associated addresses.

22. The method of claim 21 wherein said sorting step comprises the step of ranking packets having the same associated address according to priority data associated with the packets.

23. The method of claim 21 wherein said comparing step comprises the step of passing those packets which are not adjacent to higher ranked packet having identical addresses.

24. The method of claim 21 wherein said comparing step comprises the step of comparing the sorted packets and passing a selectable number of packets having the same address.

25. The method of claim 21 wherein said routing step comprises the step of passing up to a predetermined number of packets for each destination.

26. A method of switching packets between a plurality of inputs and a plurality of outputs comprising the steps of:
 queuing the packets in a plurality of input buffer circuits;
 assigning an age to the first queued packets;
 transferring the first queued packets simultaneously from the input buffer circuits through a switch having one or more planes in response to the age and addresses associated with the packets;
 sending an acknowledge signal to a sending input buffer circuit responsive to a packet being received at one of said outputs;
 updating the age of packets responsive to not receiving a corresponding acknowledge signal; and
 retransmitting packets for which an acknowledge signal is not received within a predetermined time.

27. The method of claim 26 wherein said transferring step comprises the step of switching packets over one or more switching planes each comprising a plurality of switching elements interconnected such that each plane is capable of delivering a packet from any input of said plurality of inputs to any output of said plurality of outputs.

28. The method of claim 27 wherein said transferring step comprises the step of alternately transferring packets over one or more planes each comprising a plurality of switching elements, wherein the switching elements are operable to simultaneously transfer a plurality of packets having identical addresses to a plurality of outputs associated with said same address in order to increase throughput.

29. The method of claim 27 wherein said step of transferring the packets through one or more planes each comprising a plurality of switching elements comprises the steps of:
sorting the packets responsive to address information associated therewith at each switching element;
comparing the sorted packets and passing only a predetermined number of packets having the same address; and
routing the packets passed by said comparator to outputs of the switching elements responsive to the addresses associated with the packets.

30. The method of claim 26 wherein said retransmitting step comprises the step of retransferring a packet if an acknowledgement signal is not received in a predetermined time less than or equal to the time between the starts of the switching cycles of two successive planes.

31. The method of claim 26 wherein said storing step comprises the steps of:
storing packets in a first memory;
storing the next packet to be output from the input buffer circuit to said switch in a second memory; and
transferring a new packet to said second memory responsive to receiving the acknowledge signal.

32. The method of claim 31 wherein said transfer step comprises the step of transferring a packet with the highest priority and longest time spent by said packet in a queue.

33. The method of claim 26 and further comprising the step of appending routing information, priority information and age information to incoming packets, and outputting said incoming packets to said input buffer circuits.

34. The method of claim 33 wherein said step of appending routing information comprises the step of appending addresses for routing the associated packet to an output of the switch and for routing the acknowledge signal from an output of the switch through a path topologically identical to the path originally taken by the packet to the input buffer from which the packet was sent.

35. The method of claim 26 wherein said storing step comprises the steps of:
storing a first packet in a first memory;
transmitting said first packet through a first plane; and
if an acknowledge signal does not arrive for said first packet, retransmitting said first packet through a second plane.

36. The method of claim 26 wherein said storing step comprises the steps of:
storing packets in a first memory;
transmitting ones of said packets through a first plane;
storing the next packet to be output from the input buffer circuit to said switch in a second memory;
transferring said next packet from said second memory to a second plane in response to receiving the acknowledge signal for said ones of said packets.

* * * * *